(12) United States Patent
Mleczko

(10) Patent No.: US 6,796,722 B2
(45) Date of Patent: Sep. 28, 2004

(54) TERMINATION FERRULE FOR FIBER OPTICS

(75) Inventor: Jamie A. Mleczko, Clinton Township, MI (US)

(73) Assignee: Yazaki North America, Inc., Canton, MI (US)

( * ) Notice: Subject to any disclaimer, the term of this patent is extended or adjusted under 35 U.S.C. 154(b) by 185 days.

(21) Appl. No.: 10/247,392

(22) Filed: Sep. 19, 2002

(65) Prior Publication Data

US 2004/0067028 A1 Apr. 8, 2004

(51) Int. Cl.$^7$ .............................. G02B 6/36; G02B 6/38
(52) U.S. Cl. ............................. 385/87; 385/62; 385/81; 385/84
(58) Field of Search .............................. 385/60, 62, 66, 385/69, 72, 77, 78, 81, 84, 87

(56) References Cited

U.S. PATENT DOCUMENTS

| | | | |
|---|---|---|---|
| 4,101,198 A | | 7/1978 | Heldt .......................... 385/81 |
| 4,114,979 A | | 9/1978 | Heldt .......................... 385/87 |
| 4,247,163 A | * | 1/1981 | Lumpp et al. .............. 385/136 |
| 4,679,895 A | * | 7/1987 | Huber ........................ 385/87 |
| 4,799,760 A | * | 1/1989 | Beatty et al. ................ 385/87 |
| 4,802,728 A | * | 2/1989 | Komatsu ...................... 385/78 |
| 4,815,808 A | * | 3/1989 | Honma et al. ................ 385/69 |
| 4,848,870 A | * | 7/1989 | Wisecarver et al. .......... 385/55 |
| 5,408,557 A | | 4/1995 | Hsu ............................ 385/72 |
| 5,436,994 A | | 7/1995 | Ott et al. ...................... 385/86 |
| 5,559,917 A | | 9/1996 | Ott .............................. 385/85 |
| 5,751,874 A | | 5/1998 | Chudoba et al. .............. 385/72 |

FOREIGN PATENT DOCUMENTS

JP            03-048211            3/1991

* cited by examiner

*Primary Examiner*—David V. Bruce
*Assistant Examiner*—Thomas R Artman
(74) *Attorney, Agent, or Firm*—Young & Basile, P.C.

(57) ABSTRACT

A two-piece ferrule assembly for terminating and mounting the end of an optical fiber in a threaded female socket. The assembly has an inner ferrule member with a channel for receiving and mounting the end of an optical fiber from which the jacket has been removed, and an outer ferrule member mounted to rotate on a rear portion of the inner ferrule member and having an external thread mating with the female socket. The outer ferrule member extends over the fiber jacket, and includes a rear clamping portion adapted to engage at least one of the fiber jacket and the inner ferrule member to orthogonally clamp the fiber jacket behind its connection with the inner ferrule member as the outer ferrule member is threaded into the socket.

11 Claims, 9 Drawing Sheets

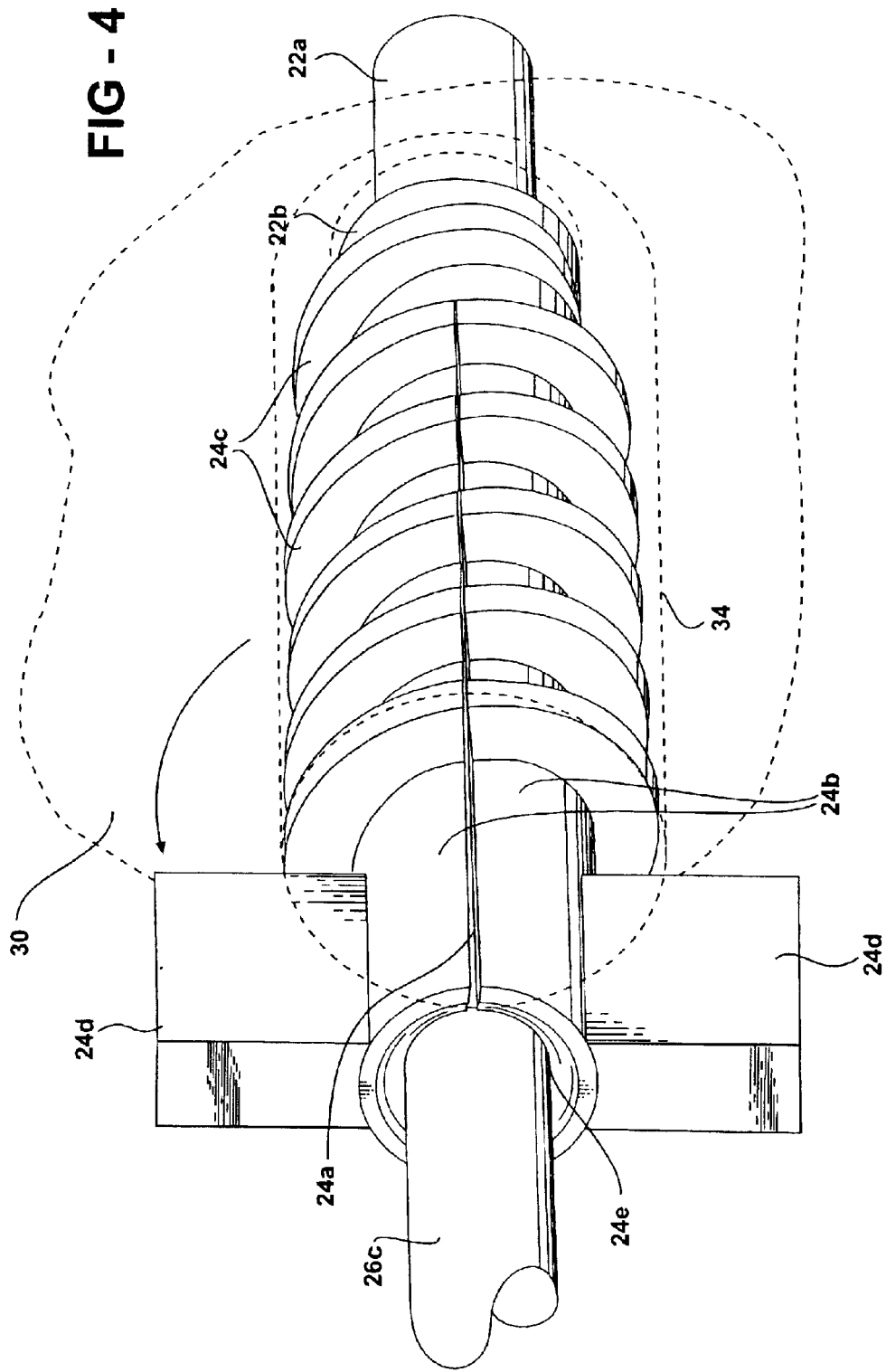

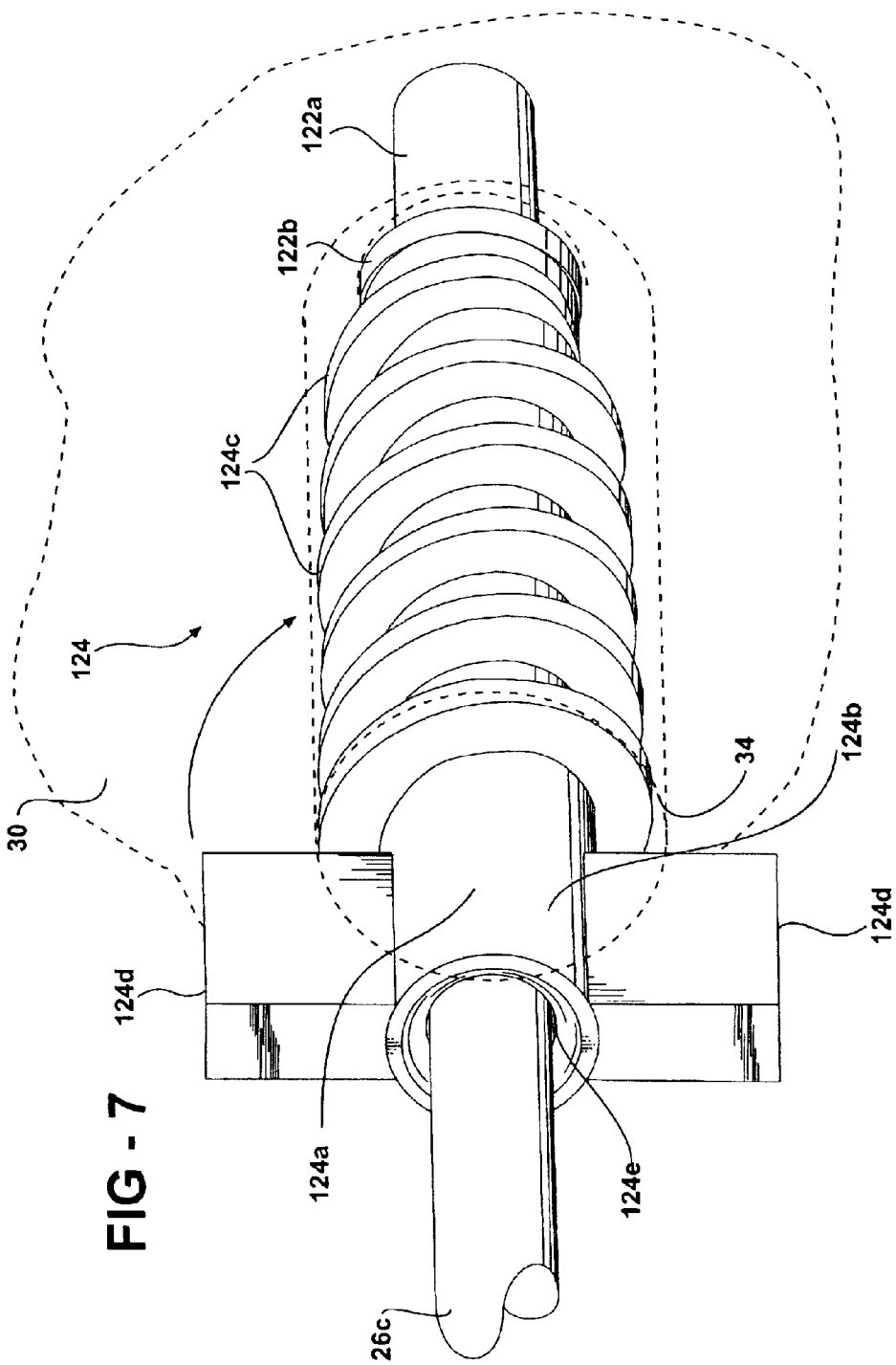

TERMINATION FERRULE FOR FIBER OPTICS

FIELD OF THE INVENTION

The present invention is in the field of optical fibers or "light pipes" that carry signals and information in the form of light, and more particularly in the field of devices used to precisely terminate and mount the ends of such fibers.

BACKGROUND OF THE INVENTION

Optical fibers are now commonly used to transmit light signals from one place to another for a variety of reasons. They may communicate an optical signal from an optical source to an optical sensor on a circuit board to turn transistors on and off. Optical fibers may also be used to sense the presence or absence of an opaque object in a gap between two aligned fiber ends, such that light is freely transmitted from one fiber end to another across the gap to complete a circuit when the object is absent, and light is blocked to break the circuit when the object is present. These are but two examples of many possible uses for optical fibers.

It is generally necessary to cleanly terminate and accurately mount the ends of optical fibers in order to maintain good light transmission quality from the terminated end to the receiving fiber or device. It is also important to mount the terminated fiber ends securely to maintain the accuracy and quality of signal transmission, especially in environments subject to vibration and/or tension such as vehicle wiring systems.

One common technique for terminating and mounting optical fiber ends is with externally threaded ferrules clamped, glued, or otherwise secured to the end of the fiber in order to mount the fiber end in an internally threaded female socket or receptacle. Problems associated with this type of mount can include fiber twisting, "z-gap attenuation", core pistoning, pullout forces, and strain on the fiber, which is often of relatively fragile, small-diameter construction.

BRIEF SUMMARY OF THE INVENTION

The present invention is a two-piece termination ferrule for securing an optical fiber end to an internally-threaded female socket or receptacle. The ferrule virtually eliminates the problems associated with such mounting arrangements, first by strongly securing the fiber end inside an inner ferrule member formed to exacting tolerances, and then by securing the inner ferrule member to the female receptacle with an externally-threaded outer ferrule member that responds to being screwed into the female receptacle by clamping the exposed jacket of the fiber behind its connection to the inner ferrule member.

In a first embodiment of the invention, the inner ferrule member is a plug-like piece with a channel for receiving and securing the stripped end of an optical fiber. The front end of the inner ferrule member includes locating features that ensure proper positioning of the fiber end in a socket. The rear portion of the inner ferrule member contains the remainder of the stripped end of the fiber, and has a rear face whose diameter matches, at least approximately, that of the unstripped fiber jacket. The threaded outer ferrule member fits rotatably over the rear portion of the inner ferrule member, and takes the form of a partially split sleeve with orthogonal clamping portions and an external socket-matching thread whose diameter increases from front to back. The clamping portions extend rearwardly beyond the junction of the optical fiber jacket and the rear face of the inner ferrule member, and can be provided with teeth or similar projections capable of gripping the fiber jacket more securely. As the outer ferrule member is threaded into the female socket, the clamping sections are progressively forced together by the increasing diameter of the external thread to clamp both the inner ferrule member and the fiber jacket behind the inner ferrule member.

The first embodiment of the invention is useful for applications where minor rotation or twisting of the optical fiber toward the end of the insertion process is acceptable or readily compensated. This rotation tends to occur as the outer ferrule member's clamping sections are squeezed down onto the fiber jacket during the last few turns, especially if gripping members or teeth bite into the jacket.

A second embodiment of the invention reduces the tendency of the fiber to twist as the outer ferrule member is screwed into the socket, and allows the fiber to untwist itself if minor twisting does occur. This is achieved by adding clamping members to the inner ferrule member, extending from the rear face to overlie and clamp the fiber jacket, and forming the bore of the outer ferrule member to rotate around and simultaneously squeeze the inner ferrule member's clamping portions against the fiber jacket as the ferrule is threaded fully into the female socket. Gripping members or teeth can be formed on the inside of the inner ferrule member's clamping portions to bite into and hold the fiber jacket more aggressively than orthogonal clamping action alone.

In both embodiments, the placement of jacket-clamping members over the fiber jacket behind the connection between the stripped end and the inner ferrule member relieves strain on the connection.

These and other features and advantages of the invention will be apparent from the following detailed description in light of the accompanying drawings.

BRIEF DESCRIPTION OF THE DRAWINGS

FIG. 4 shows the ferrule assembly of FIG. 3 screwed into the female socket.

FIG. 7 is similar to FIG. 4, but shows the second embodiment screwed into the female socket.

DETAILED DESCRIPTION OF THE INVENTION

Figure 1:
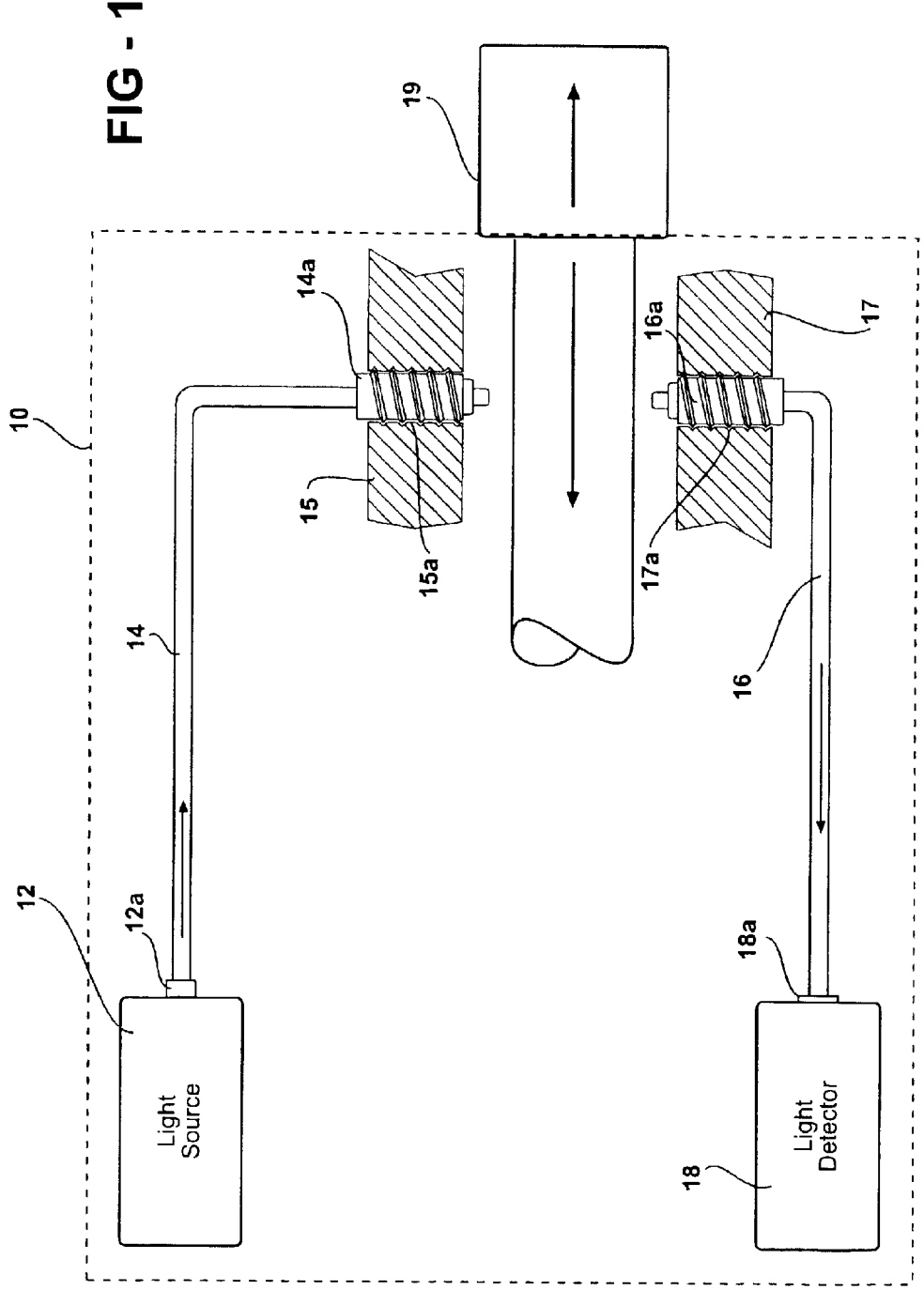
FIG. 1 is a schematic diagram of an optical circuit in which optical fibers mounted in accordance with the present invention are used to sense the presence or absence of an object.

FIG. 1 schematically shows one possible type of optical fiber application in which the ferrule termination assembly of the present invention is useful. It will be understood by those skilled in the art that this example is not limiting, as the inventive ferrule assembly can be used anywhere it is desirable to terminate an optical fiber in a threaded female socket. In FIG. 1 an optical circuit 10 is established to detect and signal the presence or absence of a movable object 19. A continuous light signal from a light source 12, for example an LED phototransmitter, is transmitted through a standard optical fiber 14 terminated in a partition or mount 15 and aimed at object 19, or the place where object 19 ought to be when "present." Optical fiber 14 can be of any known type having a core and jacket or their equivalents, by way of example having a 200-micron glass fiber core with a thin layer of hard polymer such as PTFE cladding, and a protective, flexible, outer jacket. Optical fiber 14 is terminated in a threaded ferrule 14a that also mounts the fiber end to partition 15 in a female threaded socket 15a.

A second optical fiber 16 is terminated in a partition 17 directly opposite fiber 14, aimed to receive the signal from fiber 14 and transmit the signal to a light detector 18 whenever object 19 is "absent." Optical fiber 16 is terminated in partition 17 with a ferrule 16a in a female socket 17a, in a manner identical to the mounting of fiber 14 in partition 15. Light detector 18 can be any known type of photoreceiver, for example an optical sensor on a circuit board. The presence of object 19 breaks the optical circuit between fibers 14 and 16, such that detector 18 generates a "present" signal.

It may also be desirable to connect optical fibers 14 and 16 to their respective optical devices 12 and 18 with threaded ferrules 12a and 18a similar to 14a and 16a, depending on the size and nature of the optical devices.

The alignment and spacing of terminated fiber ends in an optical circuit is always important, and can be critical, to the proper functioning of the circuit. It is therefore desirable to provide a termination arrangement that gives accurate positioning at the time of installation, and that maintains that position over the life of the installation. This is especially important in vehicle installations, where vibration is a significant factor.

Figure 2:
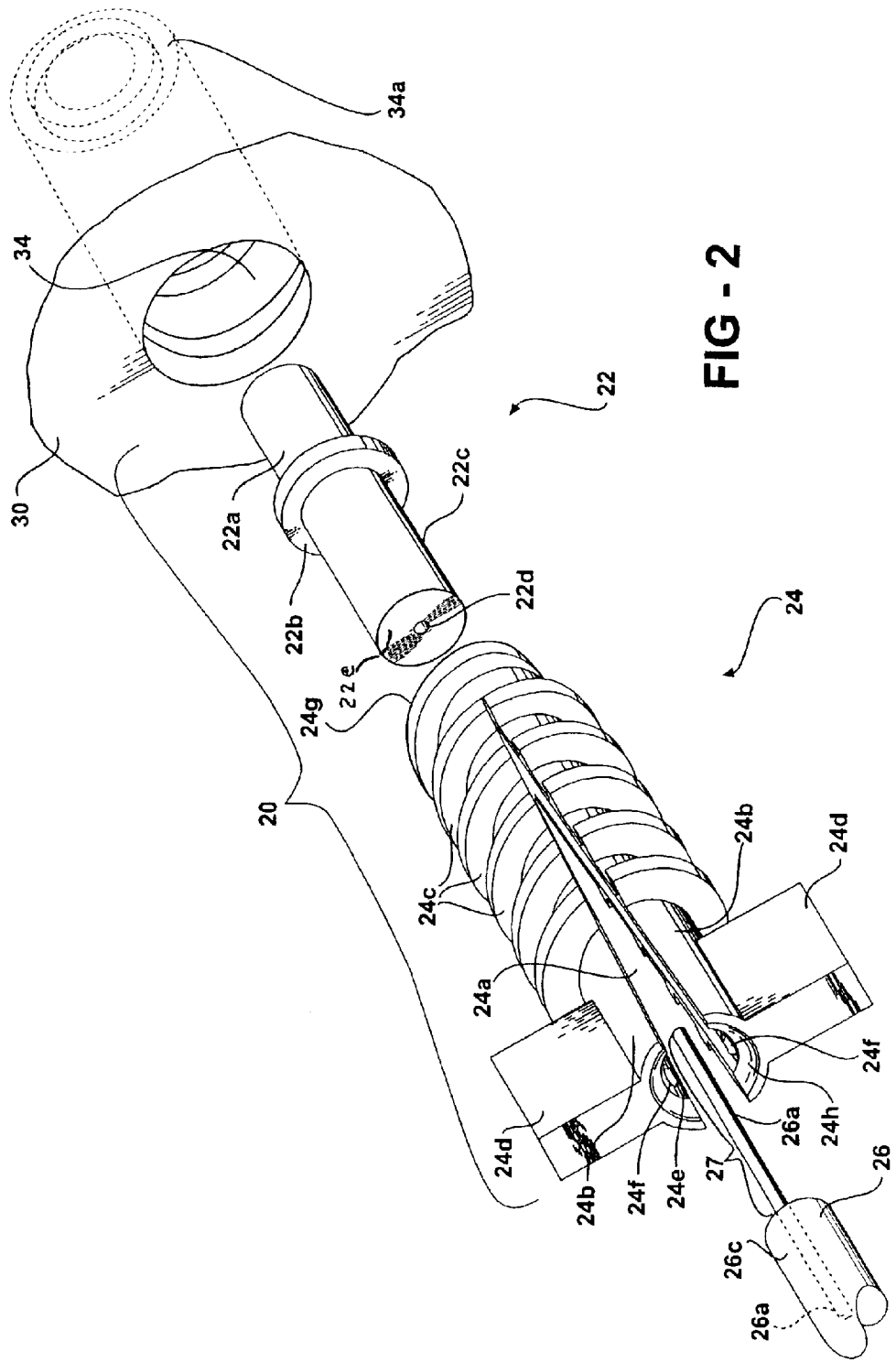
FIG. 2 is an exploded perspective view, from a rear angle, of a termination assembly according to the invention, comprising an inner ferrule member for receiving the stripped end of an optical fiber, and an outer ferrule member.

Referring to FIG. 2, a first embodiment of a ferrule termination assembly 20 according to the present invention is shown separated into an inner ferrule member 22 and an outer ferrule member 24. When assembled, ferrule assembly 20 is used to accurately terminate and securely mount the end of an optical fiber 26 in a threaded female socket 30.

Optical fiber 26 represents a typical fiber, in the illustrated embodiment having a glass fiber core 26a on the order of 200 microns in diameter with a PTFE cladding, and a jacket 26c of a known flexible, protective plastic or rubber material. The terminal end of the fiber is stripped of its outer jacket layer as shown at 27, leaving an exposed length of clad core 26a for insertion into inner ferrule member 22. It will be understood that although the illustrated embodiment is shown in use with an optical fiber of this particular type, the ferrule assembly can be adapted to virtually any optical fiber or "light pipe" having an inner core and an outer layer or jacket. It will also be understood that the term "stripped" is not limited to a fiber end from which the protective outer jacket has been removed after manufacture, but can also encompass fiber ends originally formed with exposed core.

Inner ferrule member 22 in FIG. 2 is a molded plastic piece, preferably made from a precision molding material such as liquid crystal polymer (LCP). Other known materials with varying degrees of moldability may of course be used, and forming processes other than molding may also be feasible in certain applications. The inner ferrule member 22 could be made out of any form of metal as well, because no flexing is needed. Inner ferrule member 22 has a front locating end 22a, an interface collar 22b, and a rear end 22c, with a fiber-mounting channel 22d passing coaxially from one end to the other to receive the stripped end 27 of optical fiber 26. The length of inner ferrule member 22 and its channel 22d is preferably (although not necessarily) identical to the length of stripped end 27; by locating the tip of stripped end 27 flush with the face of front end 22a, the front end 22a can positively locate the fiber tip in conjunction with collar 22b and the socket. The best way to do this would be to strip the fiber to a length that allows the fiber to protrude beyond the ferrule front end. Then some secondary process such as cleaving or polishing, would be used to finish off the fiber end with respect to the face of front end 22a. The diameters of front end 22a and collar 22b are preferably sized to mate with locating features in socket 30, for example a shoulder 34 defining an opening 34a sized for front end 22a in as exact and concentric a fit as possible.

Outer ferrule member 24 is also illustrated as a molded plastic piece, although since the tolerances are generally less critical than those of inner ferrule member 22, and since the flexibility and threadability of portions of member 24 are important, a wider variety of known plastic materials or even metals will be appropriate. Nylons, polypropylenes, and various resins are a few possible examples. Outer ferrule member 24 is a substantially tubular member partially split as indicated generally at 24a to form two clamping sections 24b over a rear portion of the ferrule member. In the illustrated embodiment, split 24a is a narrow triangular section of material removed from the wall of the outer ferrule member 24 on each side, such that the spacing or gap visible in FIG. 2 occurs in the ferrule's relaxed state. Clamping sections 24b in FIG. 2 define a cylindrical bore of constant diameter. Forcing clamping sections 24b together to close the split reduces the diameter of the bore and may even deform it from its normal cylindrical shape, both serving to orthogonally clamp the jacket of a fiber.

External thread 24c is molded on the outside of the ferrule member, extending from a point near front end 24g rearwardly over at least a portion of clamping sections 24b. Thread 24c may be in the form of a single, continuous thread interrupted only by split 24a, or it may comprise any known interrupted thread form, as long as it is capable of mating with the intended female socket. Thread 24c stops at a set of rotation tabs 24d sized to be easily gripped with the fingers or a gripping device to rotate the ferrule member. Outer ferrule member 24 has a bore 24e sized at its forward end to fit closely but rotatably over rear portion 22c of the inner ferrule member, and sized at its rear end to fit closely over and clamp the fiber jacket when clamping halves 24b are squeezed together. In the illustrated embodiment, where it is preferred that the diameter of the fiber jacket match the diameter of rear face 22e on rear portion 22c, the bore 24e has a uniform diameter. One or more jacket-gripping members or teeth 24f are optionally formed in the rear portion of bore 24e, sized to bite or grip the fiber jacket more deeply and securely than the orthogonal clamping action of the split bore surfaces alone.

Front end 24g of the outer ferrule member is sized and shaped to fit rotatably against collar 22b on the inner ferrule member. Clamping sections 24b are long enough to extend over significant portions of both the rear portion 22c of the inner ferrule member and the unstripped fiber jacket 26c; the exact proportions can be determined by those skilled in the art for particular installations and fibers. The rear end or face 24h of the outer ferrule member can be chamfered as illustrated, if desired. Thread 24c on the outer ferrule member 24 increases in diameter from front to rear.

Figure 3:
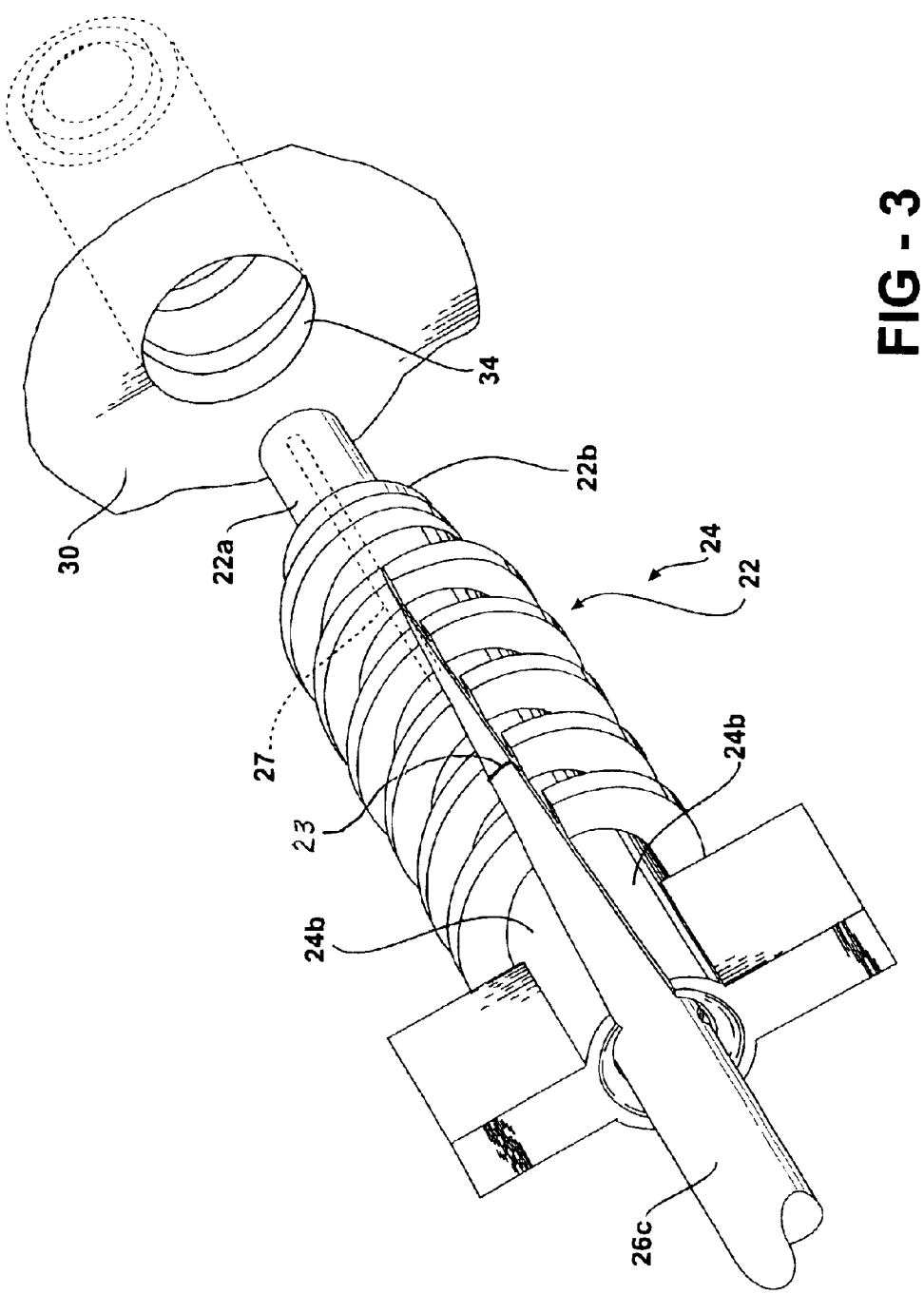
FIG. 3 illustrates the assembly of FIG. 2 assembled prior to installation, with the inner ferrule member secured over the stripped end of the optical fiber, and the outer ferrule member rotatably mounted over the inner ferrule member prior to threading the assembly into a female socket.

FIG. 3 shows stripped end 27 of optical fiber 26 inserted into inner ferrule member 22, and outer ferrule member 24 assembled over inner ferrule member 22. The stripped end 27 of the optical fiber is inserted into channel 22d from the rear of the inner ferrule member, and secured inside with a known adhesive or epoxy, preferably along its entire length. The entrance to channel 22d may be chamfered for easier insertion of stripped end 27. The end of fiber jacket 26c abuts the end face of the inner ferrule member at intersection 23, such that it effectively forms an extension of rear portion 22c. Outer ferrule member 24 is rotatably mounted on rear portion 22c of the inner ferrule member with its front end against collar 22b, and can include detent or other retaining features (not shown) to hold it loosely on the inner ferrule member once mounted to prevent loss. Prior to being inserted into female socket 30, split clamping sections 24b are able to rotate without difficulty over both rear portion 22c of the inner ferrule and fiber jacket 26c. The ferrule assembly of FIG. 3 is ready to be threaded into socket 30 to mount the optical fiber.

FIG. 4 shows the ferrule assembly of FIG. 3 threaded into socket 30 using tabs 24d. As the outer ferrule member is advanced into the socket's threads, axially carrying the inner ferrule member into the socket via collar 22b, the increasing diameter of the outer ferrule thread 24c progressively forces clamping sections 24b together over first the rear portion 22c of the inner ferrule member, and at or near the end of the insertion process against the fiber jacket 26c. The bore 24e in the outer ferrule member is sized relative to rear portion 22c and fiber jacket 26c to remain freely rotatable over them until the clamping halves are almost fully together, such that twisting of the fiber as it is clamped between sections 24b is minimized. Any twisting of fiber 26 will therefore be limited to the last few turns (or partial turns, depending on the number and pitch of the threads). Minor twisting is acceptable for long lengths of relatively flexible fibers. Any teeth 24f in the bore of the outer ferrule member engage fiber jacket 26c before sections 24b are fully clamped, improving the final hold on the fiber but tending to increase twisting.

Figure 4A:
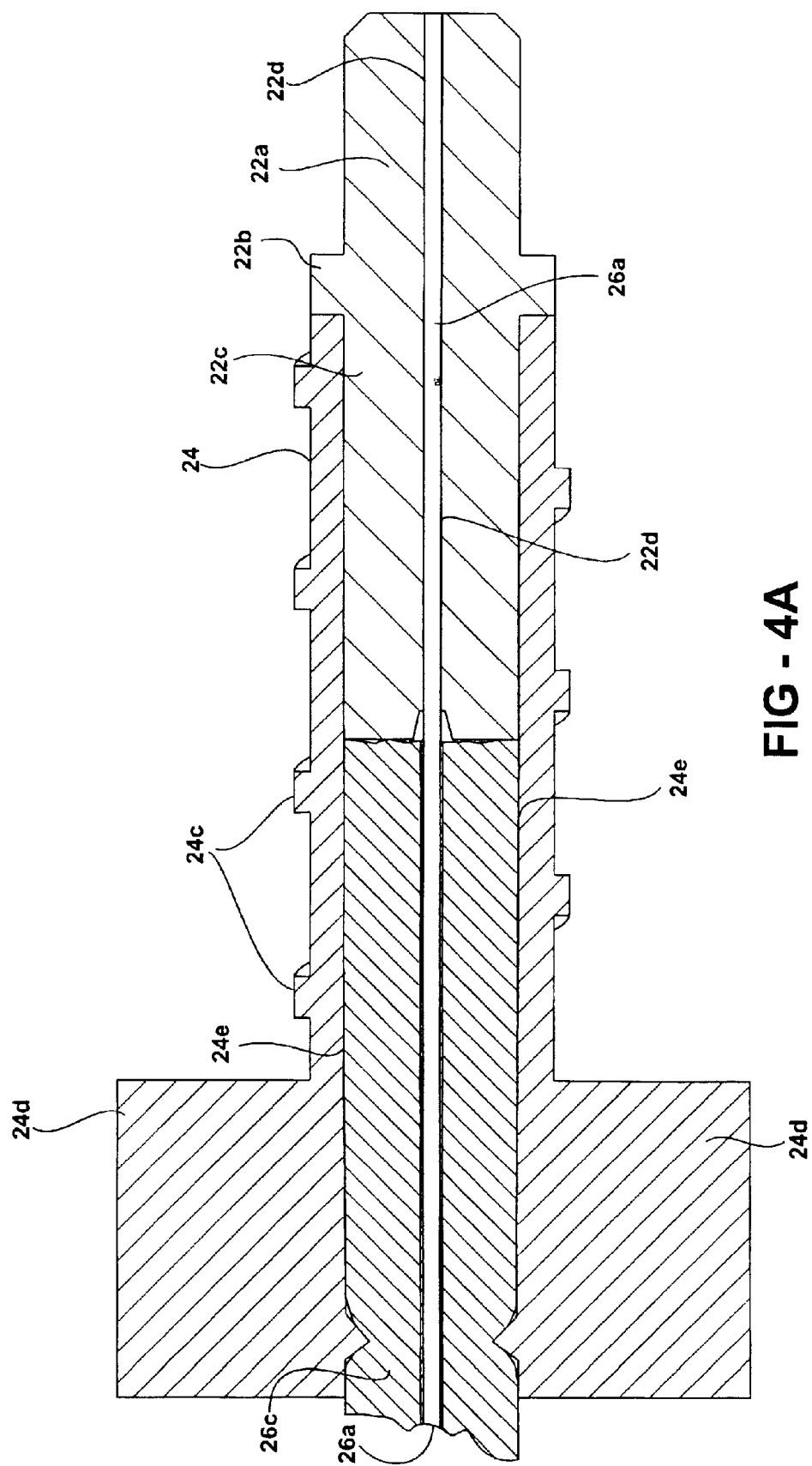
FIG. 4A is a side elevational view of the ferrule assembly installed as in FIG. 4, in cross-section.

Referring now to FIGS. 4 and 4A, once the ferrule-terminated fiber is fully threaded into socket 30, both the ferrule assembly 20 and the fiber 26 are locked securely in place relative to the socket and any optical device or circuit portion at which the fiber is aimed or with which it is aligned. The orthogonal clamping force between the socket, clamping sections 24b, the inner ferrule member, and the fiber, along with any deformation of the clamping portion along the split, creates a torque fastener effect relative to socket 30 to prevent the threaded connection from loosening and the ferrule assembly from backing out under vibration. Socket 30 can also include twist-locking structure of known type (not shown) to lockingly engage tabs 24d once the ferrule assembly is fully inserted. Strain relief on the connection between the optical fiber and the inner ferrule member is provided by the portion of the outer ferrule member extending over the fiber jacket behind the inner ferrule member. The long, large-area epoxy connection between channel 22d and the stripped end of the fiber reduces core pistoning of the fiber relative to the inner ferrule member.

Figure 5:
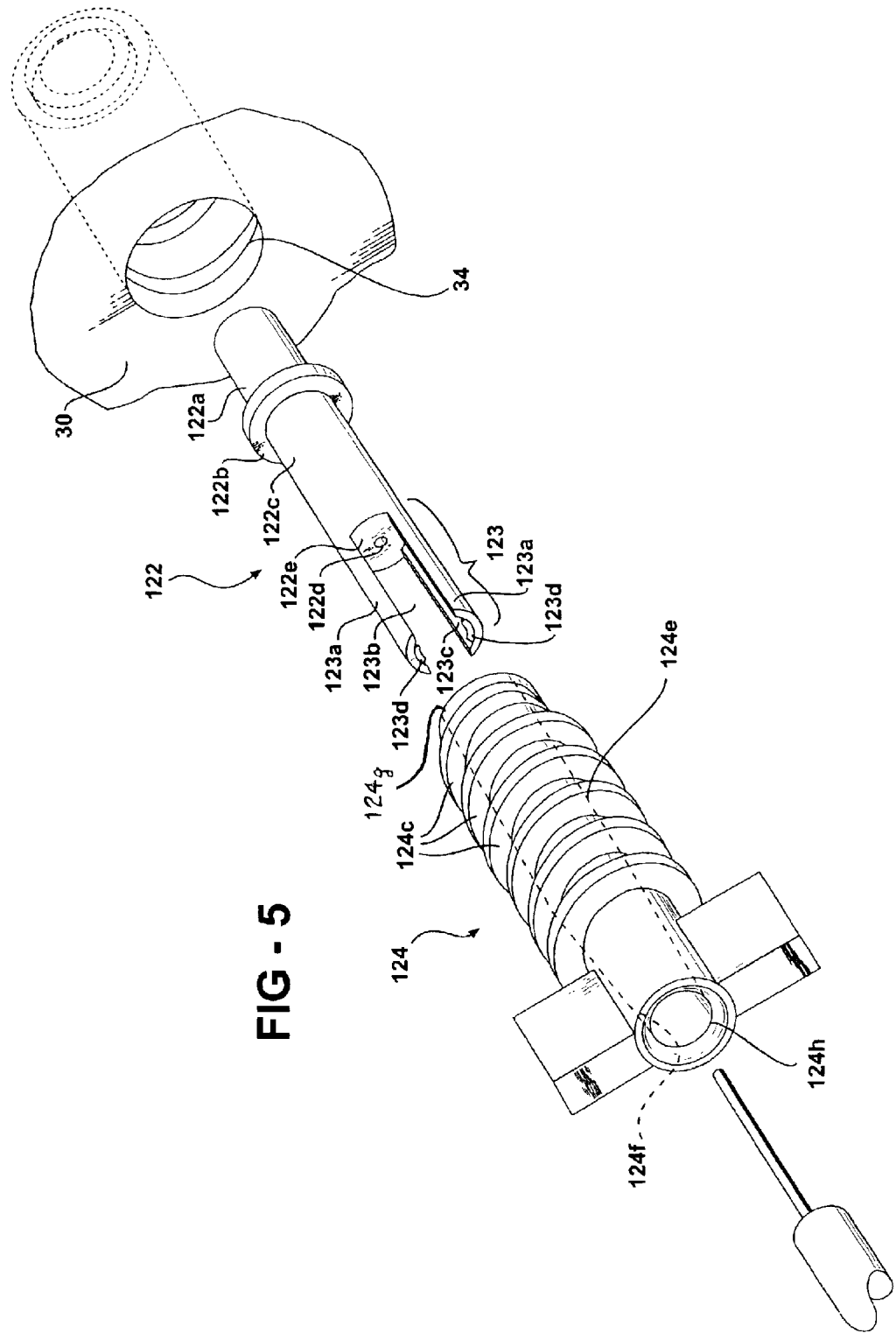
FIG. 5 is similar to FIG. 2, but shows a second embodiment of the invention in which the inner ferrule member has a rear clamping portion and the outer ferrule member has an internal bore contour for activating the clamping portion on the inner ferrule member.
Figure 6:
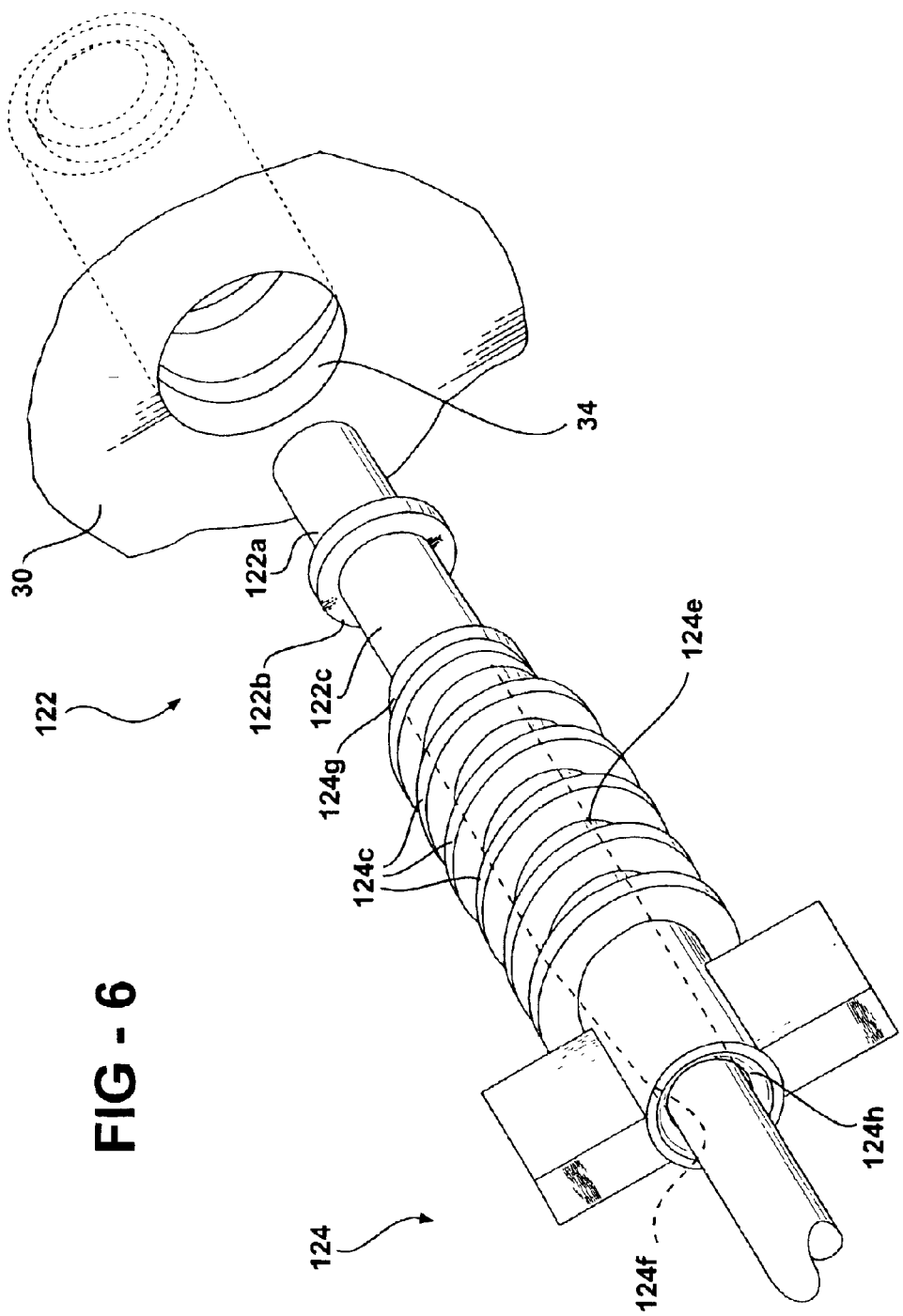
FIG. 6 is similar to FIG. 3, but shows the second embodiment assembled prior to installation.

The foregoing embodiment of FIGS. 2–4 is suitable for applications where some twisting of the fiber is acceptable. For applications in which twisting of the fiber is not acceptable, such as those with short fiber lengths and/or inflexible fiber, an alternate ferrule assembly is shown in FIGS. 5–7. The alternate ferrule assembly uses an inner ferrule member 122 and an outer ferrule member 124 to terminate and mount the same optical fiber 26 in the same socket 30, with the thread-responsive clamp-actuating function retained on the outer ferrule member but with the direct jacket-clamping members moved to the inner ferrule member.

Referring to FIG. 5, inner ferrule member 122 has a front end 122a, collar 122b, rear portion 122c, and fiber channel 122d similar to the corresponding parts of inner ferrule member 22 in FIGS. 2–4. However, inner ferrule member 122 also includes split clamping portion 123 extending from rear face 122e, including clamping sections 123a separated by a split or gap 123b, an inner surface or bore 123c whose diameter matches, at least approximately, the outer diameter of optical fiber jacket 26c, and optional jacket-gripping members or teeth 123d in bore 123c. Because clamping portion 123 is formed as an integral part of inner ferrule member 122, which is preferably molded from a relatively stiff, precision-moldable plastic, its clamping sections will tend to be less flexible and more resistant to deformation than the clamping sections of outer ferrule member 24 in FIGS. 2–4. The gap or split 123b is wider and rectangular in shape, illustrating the different clamping section geometries possible for different materials. Like the clamping sections 24b in FIGS. 2–4, sections 123a are illustrated as opposed halves, but it will be apparent to those skilled in the art that the size, shape, and number of orthogonal clamping sections in either embodiment can vary and still function with the outer ferrule member to clamp the fiber jacket.

Outer ferrule member 124 can be formed from any of the same plastic or metal materials available for outer ferrule member 24 in FIGS. 2–4, as well as less flexible or deformable materials. Outer ferrule member 124 is not split but forms an unbroken tube. Unlike the increasing thread diameter of outer ferrule member 24 in FIGS. 2–4, the diameter of thread 124c is constant. The inner bore 124e is cylindrical over the greater part of the ferrule member's length from front to back, but tapers in bottleneck fashion to a reduced diameter portion 124f over a relatively short length adjacent rear end 124h. There may need to be a small taper at the entrance to bore 124c to allow clamping sections 123a to fit in the bore should they be slightly spread open from the insertion of the fiber over teeth 123d.

FIG. 6 shows the components of FIG. 5 assembled prior to installation in socket 30. The stripped end 27 of optical fiber 26 is epoxied into channel 122d in the inner ferrule member, with fiber jacket 26c abutting rear face 122e. The outer ferrule member is secured rotatably over rear portion 122c of the inner ferrule member. The front end 124g of the outer ferrule member is spaced rearwardly from collar 122b, ensuring that tapered bore portion 124f is not yet engaged with clamping portion 123, but lies rotatably over a portion of fiber jacket 26c behind the clamping section. Clamping sections 123a can be sized to be flexed apart when the fiber jacket is inserted between them to improve their subsequent orthogonal clamping action.

Figure 7A:
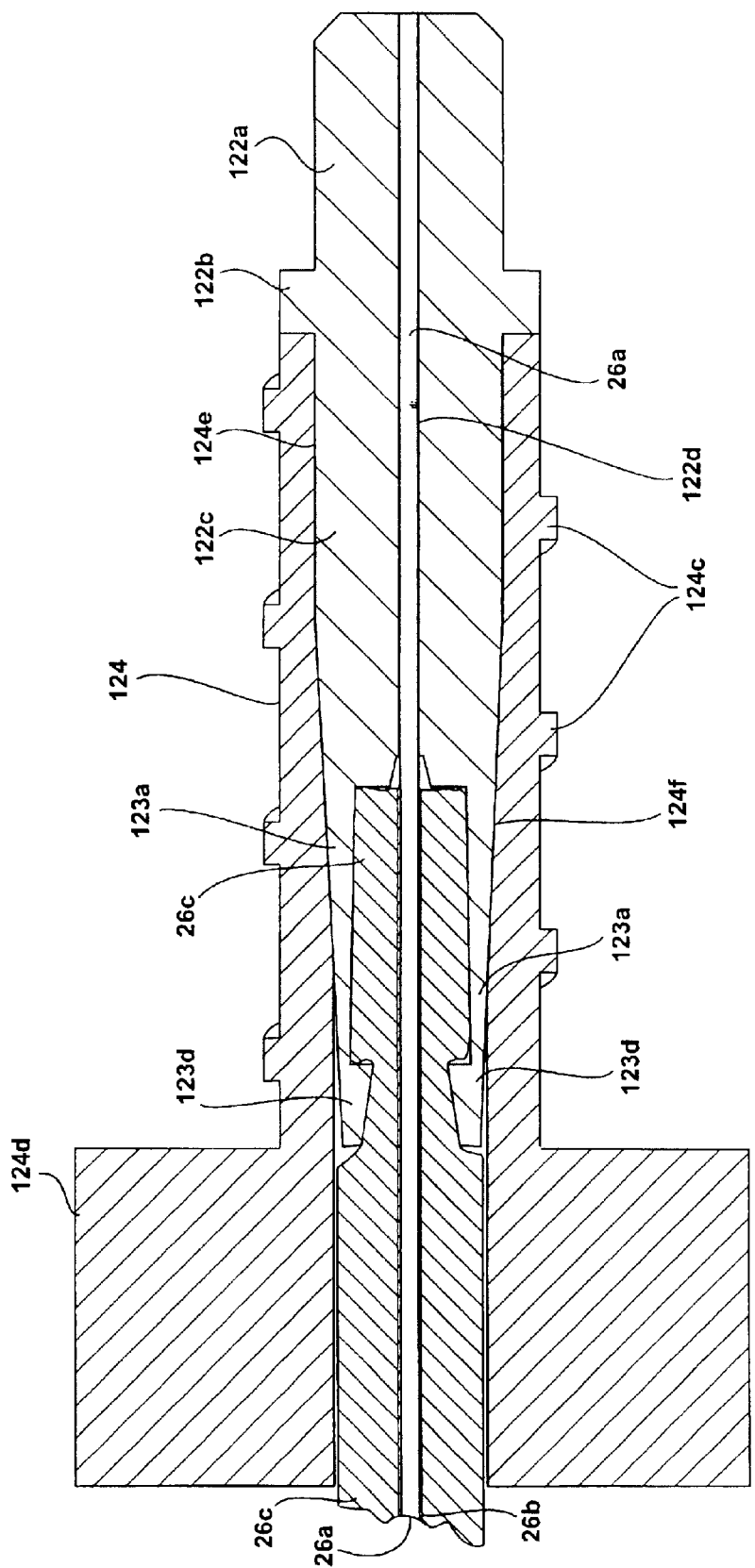
FIG. 7A is similar to FIG. 4A, but shows the second embodiment in cross-section in its installed condition.

In FIGS. 7 and 7A the ferrule assembly of FIG. 6 has been installed in socket 30. Depending on the depth of the socket, the length of front end 122a of the inner ferrule member, and the initial spacing between collar 122b and outer ferrule member 124, the inner ferrule member may first be axially inserted into the socket as far as it will go prior to engagement of the socket threads and the outer ferrule member. Alternately, the action of threading the outer ferrule member into the socket can be used to drive the inner ferrule member axially into the socket. As the outer ferrule member is threaded into the socket, with the inner ferrule member having reached its axial limit of travel into the socket, the outer ferrule member advances forward over the clamping portion 123 and rear portion 122c. When tapered rear bore portion 124f engages the ends of the clamping sections in clamping portion 123, it begins to squeeze them together to clamp the fiber jacket 26. This squeezing action remains orthogonal to the fiber as the outer ferrule member rotates around the inner ferrule member, such that no significant twisting force is applied to the fiber. The presence of optional teeth 123d improves the grip of the inner ferrule member on the fiber, but likewise does not apply twisting force to the fiber.

Once the ferrule-terminated fiber is fully threaded into socket 30, both the ferrule assembly and the fiber 26 are locked securely in place relative to the socket and any optical device or circuit portion at which the fiber is aimed or with which it is aligned. Once the assembly is fully threaded, the fiber 26 and inner ferrule 122 are still able to rotate with respect to the outer ferrule 124 and socket 30, if such rotation is required. By "fully threaded" is meant as far as it will go given a particular socket and axial locating relationship between the ferrule and the socket; it is not necessary that every portion of the outer ferrule member's external thread be inserted into the socket. It will be understood by those skilled in the art that although both the embodiment of FIGS. 2–4 and the embodiment of FIGS. 5–7 are described with a particular axial locating relationship between the front end of the inner ferrule member and the socket, it is possible although perhaps less desirable to use the outer ferrule member to axially locate the ferrule-terminated fiber end relative to the socket.

From the foregoing embodiments it will be apparent to those skilled in the art that various minor modifications can be made to the structure of the inner and outer ferrule members without departing from the scope of the invention. Relative lengths, thread form and sizing, socket interface features, types of optical fiber, materials, gripping and rotation member geometry and other dimensions and features can be modified while preserving the functionality of the thread-responsive orthogonal clamping action of the embodiments disclosed above.

I accordingly claim:

1. A ferrule assembly for terminating a jacketed optical fiber and mounting it securely in a female threaded socket, comprising:
    an inner ferrule member having a fiber channel for receiving and securely mounting a stripped end of the optical fiber, an external collar dividing the inner ferrule assembly into a forward end and a cylindrical rear end having a rear face with a diameter matching the diameter of the optical fiber jacket;
    a tubular outer ferrule member having a bore sized to rotatingly fit over the rear end of the inner ferrule member, a front end sized to rotatingly abut the inner ferrule member's external collar, and a rear clamping portion extending beyond the rear face of the inner ferrule member to overlie a portion of the optical fiber jacket when the stripped end of the optical fiber is secured in the fiber channel of the inner ferrule member, the outer ferrule member having an external thread adapted to mate with the female threaded socket as the outer ferrule member is rotated about the rear end of the inner ferrule member, the fiber clamping portion engaging at least one of the optical fiber jacket and the rear end of the inner ferrule member with an orthogonal clamping action as the outer ferrule member is threaded into the female socket.

2. The ferrule assembly of claim 1, wherein the rear clamping portion of the outer ferrule member comprises a split portion of the tubular outer ferrule member defining orthogonal clamping sections.

3. The ferrule assembly of claim 2, wherein the external thread on the outer ferrule member has an increased diameter associated with the rear clamping portion, such that the orthogonal clamping sections are forced together to clamp the fiber jacket as the ferrule assembly is threaded into the female socket.

4. The ferrule assembly of claim 2, wherein the bore of the outer ferrule member in a portion of the orthogonal clamping sections located behind the inner ferrule member has a reduced diameter section whose diameter is less than the diameter of the fiber jacket.

5. The ferrule assembly of claim 4, wherein the bore of the outer ferrule member in the portion of the orthogonal clamping sections overlying the fiber jacket is provided with jacket gripping projections.

6. The ferrule assembly of claim 1, wherein the rear clamping portion of the outer ferrule member comprises a reduced diameter portion of the bore, and the inner ferrule member includes orthogonal clamping sections extending rearwardly from the rear face over a portion of the fiber jacket and into the bore of the outer ferrule member such that the reduced diameter portion of the bore forces the orthogonal clamping sections against the fiber jacket when the outer ferrule member is threaded into the female socket.

7. The ferrule assembly of claim 6, wherein the orthogonal clamping sections of the inner ferrule member are provided with jacket gripping projections on inside surfaces thereof.

8. The ferrule assembly of claim 1, wherein the outer ferrule member includes an external gripping portion to the rear of the external thread for grasping and rotating the outer ferrule member.

9. A ferrule assembly for terminating a jacketed optical fiber and mounting it securely in a female threaded socket, comprising:
    an inner ferrule member with a channel for receiving and mounting the end of an optical fiber from which the jacket has been removed, and an outer ferrule member mounted to rotate on a rear portion of the inner ferrule member and having an external thread for mating with the female socket, the outer ferrule member having a rear clamping portion extending over the fiber jacket and adapted to engage at least one of the fiber jacket and the inner ferrule member orthogonally clamp the fiber jacket behind the end of the optical fiber mounted in the inner ferrule member as the outer ferrule member is threaded into the socket.

10. The ferrule assembly of claim 9, wherein the rear clamping portion of the outer ferrule member engages the fiber jacket directly.

11. The ferrule assembly of claim 9, wherein the rear clamping portion of the outer ferrule member engages the fiber jacket indirectly through a rear clamping portion of the inner ferrule member.

* * * * *